United States Patent
Chandran

(10) Patent No.: US 10,855,599 B2
(45) Date of Patent: *Dec. 1, 2020

(54) METHODS AND SYSTEMS FOR DYNAMIC POLICY BASED TRAFFIC STEERING OVER MULTIPLE ACCESS NETWORKS

(71) Applicant: VIASAT, INC., Carlsbad, CA (US)

(72) Inventor: Girish Chandran, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,676

(22) Filed: Apr. 17, 2019

(65) Prior Publication Data
US 2019/0312814 A1  Oct. 10, 2019

Related U.S. Application Data

(63) Continuation of application No. 15/216,599, filed on Jul. 21, 2016, now Pat. No. 10,277,514.

(51) Int. Cl.
| | |
|---|---|
| *H04L 12/813* | (2013.01) |
| *H04W 48/18* | (2009.01) |
| *H04L 12/54* | (2013.01) |
| *H04L 12/24* | (2006.01) |
| *H04L 12/803* | (2013.01) |
| *H04L 29/08* | (2006.01) |

(Continued)

(52) U.S. Cl.
CPC .......... *H04L 47/20* (2013.01); *H04L 12/5692* (2013.01); *H04L 41/082* (2013.01); *H04L 47/122* (2013.01); *H04L 67/18* (2013.01); *H04W 48/18* (2013.01); *H04L 43/08* (2013.01); *H04W 88/06* (2013.01)

(58) Field of Classification Search
None
See application file for complete search history.

(56) References Cited

U.S. PATENT DOCUMENTS

| | | |
|---|---|---|
| 6,553,208 B1 | 4/2003 | Worger et al. |
| 6,681,232 B1 | 1/2004 | Sistanizadeh et al. |

(Continued)

FOREIGN PATENT DOCUMENTS

| | | |
|---|---|---|
| CO | 02070055 | 8/2002 |
| EA | 016898 B1 | 8/2012 |

(Continued)

OTHER PUBLICATIONS

Ganguly et al., "Intelligent Wi-Fi Offload-Solving the service provider challenge for a better Wi-Fi experience", OVUM (Mar. 18, 2014); 15 pages.

(Continued)

*Primary Examiner* — Michael J Moore, Jr.
(74) *Attorney, Agent, or Firm* — Chang & Hale LLP

(57) ABSTRACT

Methods and systems for individual forward-link and return-link policies for network communication are disclosed. In some aspects, the individual forward-link and return-link policies define how data is routed over a plurality of access networks between a client-side enforcement unit and a provider-side enforcement unit. In some aspects, the individual policies may be based on metrics collected by the client-side and provider-side enforcement units, which may be positioned on each end of one or more access networks.

17 Claims, 9 Drawing Sheets

(51) Int. Cl.
*H04W 88/06* (2009.01)
*H04L 12/26* (2006.01)

(56) References Cited

U.S. PATENT DOCUMENTS

| | | | |
|---|---|---|---|
| 6,954,454 | B1 | 10/2005 | Schuster et al. |
| 6,985,454 | B1 | 1/2006 | Wiedeman et al. |
| 7,215,652 | B1 | 5/2007 | Foley et al. |
| 8,401,006 | B2 | 3/2013 | Johnson et al. |
| 8,495,207 | B2 | 7/2013 | Lee |
| 8,612,612 | B1 | 12/2013 | Dukes et al. |
| 8,855,625 | B2 | 10/2014 | Tipton et al. |
| 8,874,729 | B2 | 10/2014 | Hu et al. |
| 9,355,228 | B2 | 5/2016 | Smith, III et al. |
| 10,277,514 | B2 * | 4/2019 | Chandran ............... H04L 67/18 |
| 2002/0145981 | A1 | 10/2002 | Klinker et al. |
| 2005/0282493 | A1 | 12/2005 | Chuprun et al. |
| 2006/0050736 | A1 | 3/2006 | Segel |
| 2007/0110035 | A1 | 5/2007 | Bennett |
| 2007/0201371 | A1 | 8/2007 | Chou et al. |
| 2008/0144563 | A1 | 6/2008 | Hart |
| 2010/0008291 | A1 | 1/2010 | LeBlanc et al. |
| 2012/0044807 | A1 | 2/2012 | Johnson et al. |
| 2013/0219035 | A1 | 8/2013 | Detienne et al. |
| 2014/0123212 | A1 | 5/2014 | Wanser et al. |
| 2014/0136676 | A1 | 5/2014 | Chow et al. |
| 2014/0140211 | A1 | 5/2014 | Chandrasekaran et al. |
| 2014/0233385 | A1 | 8/2014 | Beliveau et al. |
| 2014/0317276 | A1 | 10/2014 | Tie et al. |
| 2015/0173008 | A1 | 6/2015 | Siddam |
| 2015/0188810 | A1 | 7/2015 | Salkintzis |
| 2015/0319662 | A1 | 11/2015 | Enomoto et al. |
| 2017/0295103 | A1 | 10/2017 | Starsinic et al. |

FOREIGN PATENT DOCUMENTS

| | | |
|---|---|---|
| EP | 1052812 A2 | 11/2000 |
| GB | 2388747 A | 11/2003 |
| RU | 2573782 C1 | 1/2016 |
| WO | 2001069397 A1 | 9/2001 |
| WO | 2012149954 A1 | 11/2012 |
| WO | 2014112940 A1 | 7/2014 |
| WO | 2014119968 A1 | 8/2014 |
| WO | 2014130091 A1 | 8/2014 |
| WO | 2014189448 A1 | 11/2014 |

OTHER PUBLICATIONS

International Search Report and Written Opinion dated in International (PCT) Application No. PCT/US2017/042243 dated Sep. 4, 2017, 13 pgs.

International Search Report and Written Opinion dated Mar. 2, 2009 for Application No. PCT/US2007/087978, filed Dec. 18, 2007 (20 pages).

NEC Corporation,"OpenFlow-based SDN Data Center Interconnect"— Product Brochure ProgrammableFlow®-(2014) 2 pages.

Salaets, B. "Advanced Traffic Steering & Optimization Technologies", F5 Networks, Inc., Power-Point-Presentation in Dubai; Mar. 2014; downloaded from http://www.menog.org/meetings/previous/menog-14/; 31 pages.

International Preliminary Report on Patentability for International (PCT) Application No. PCT/US2017/042243 dated Jan. 31, 2019, 9 pgs.

EPO Intention to Grant for EP 17 743 454.5 dated May 12, 2019, 7 pgs.

Examination Report for Chilean Application No. 201900150 dated Dec. 16, 2019, 11 pgs.

* cited by examiner

METHODS AND SYSTEMS FOR DYNAMIC POLICY BASED TRAFFIC STEERING OVER MULTIPLE ACCESS NETWORKS

FIELD

Embodiments relate generally to communications systems, and, more particularly, to improved methods of routing communication across multiple access networks.

BACKGROUND

Multiple access networks may be available for communicating data between a communication terminal and a destination accessible via the access networks. Given the different characteristics these access networks may have, improved methods and systems for managing communication with the communication terminal across these access networks are needed.

BRIEF SUMMARY

Disclosed are methods and systems for providing dynamic policy updates to provider-side and client-side enforcement units, which control forward-link and return-link traffic respectively over multiple access networks. The policy updates control how network communication between a client-side communication terminal and a destination accessible via an access network is routed from its source to its destination.

As discussed in the description that follows, a communication terminal may include equipment that provides network connectivity to multiple access networks that provide communication between the terminal and one or more destination networks. By routing the data dynamically over multiple access networks using the techniques described herein, a number of benefits may be realized. For example, policies can be specific to individual users, in contrast to network policies that apply to all users. Furthermore, policies can be dynamically modified over a period of time, based on for example, user behavior. For example, in some embodiments, usage quotas may be placed on individual users. A first policy may be in effect when a user is under their allocated quota, but the user may be assigned a second policy that changes how network messages generated by the user are routed when their usage exceeds the quota. Furthermore, in some aspects, the access networks themselves may have usage quotas. Thus, when use of a particular access network exceeds a predetermined amount of usage, network routing policies may be updated such that fewer network messages are routed over that access network. Furthermore, in some aspects, clientside communication terminals may be mobile, and thus move from one portion of an access network to another portion, or from one access network to another. To maintain network service as the communication terminal moves, policies for a user and/or an access terminal may be dynamically updated to adapt to the access terminals changing location. For example, as a user moves from an area covered by a first satellite beam to a second satellite beam, their routing policy may be updated to route their network messages preferentially over the second satellite beam.

In some aspects, policies may be applied to communication terminals within a geographic region. For example, some regions may implement a particular policy during peak demand time periods while access networks within other regions may implement different policies during the same peak demand time periods. These peak demand policies may be different than non-peak traffic policies within the access networks.

In the disclosed methods and systems, a client-side enforcement unit is located at a client-side of the access network, such that it is able to route data generated by one or more network devices over one or more available access networks, and such that data received from the access networks may be delivered to the as appropriate. The client-side enforcement unit performs this routing function based on return-link policy information provided by a policy management unit, also discussed below.

The disclosed methods and systems may also utilize a provider-side enforcement unit, located on an alternate end of the access network(s) discussed above. The policy management unit may be configured to generate separate forward-link policy information to be applied by the provider-side enforcement units. In some cases, the return-link policy information and forward-link policy information may cause each of the client-side enforcement unit and provider-side enforcement unit respectively to make different routing decisions for a single network conversation (such as a TCP connection, UDP datagram exchange between SSAP/DSAP, etc). For example, in some aspects, forward-link data for a particular network conversation may follow a first network path and return-link data for that same network conversation may follow a different second network path.

Furthermore, the forward-link and return-link policies generated for the provider-side enforcement unit and client-side enforcement units may be updated dynamically. For example, the policies may be updated in response to one or more of a change of location of the client-side enforcement unit, changing network conditions of the one or more access networks available to the client-side communication terminal, an amount of data or number of network messages transmitted to and/or from the communication terminal, and other factors.

The policy management unit may further generate policies for the client-side enforcement unit and provider-side enforcement unit based on a variety of factors, including network conditions of the one or more access networks. For example, latencies, throughputs, packet loss statistics, and other characteristics may vary between the multiple access networks available to the client-side enforcement unit and its corresponding communication terminals. In some aspects, one or more metrics representing these network conditions may be generated in the client-side enforcement unit and/or provider-side enforcement unit, based on its use of the respective access networks.

These characteristics may affect the efficiency of network communication over each of the access networks. In some aspects, the policy management unit may determine that some types of traffic (such as latency sensitive traffic) are to be transmitted over a first access network with a link having lower latency, while traffic that is less latency sensitive is transmitted over a second access network with a link having higher latency. For example, latency sensitive traffic may include web browsing traffic, while latency insensitive traffic may include email and streaming traffic.

After the policy management unit generates a return-link policy based on the network conditions of the access networks available to the client-side enforcement unit and the corresponding one or more communication terminals, the policy management unit transmits the updated return-link policy to the client-side enforcement unit, which then routes traffic generated by the one or more communication terminals, via the client-side enforcement unit, over the available access networks based on the received return-link policy. Similarly, after the policy management unit generates a forward-link policy based on the network conditions of the access networks available to the provider-side enforcement unit, the policy management unit transmits the updated forward-link policy to the provider-side enforcement unit, which then routes traffic generated destned for the one or more communication terminals, via the provider-side enforcement unit, over the available access networks based on the received forward-link policy.

BRIEF DESCRIPTION OF THE DRAWINGS

The present disclosure is described in conjunction with the figures.

In the figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present disclosure. However, one having ordinary skill in the art should recognize that the disclosure can be practiced without these specific details. In some instances, circuits, structures, and techniques have not been shown in detail to avoid obscuring the present disclosure.

Figure 1:
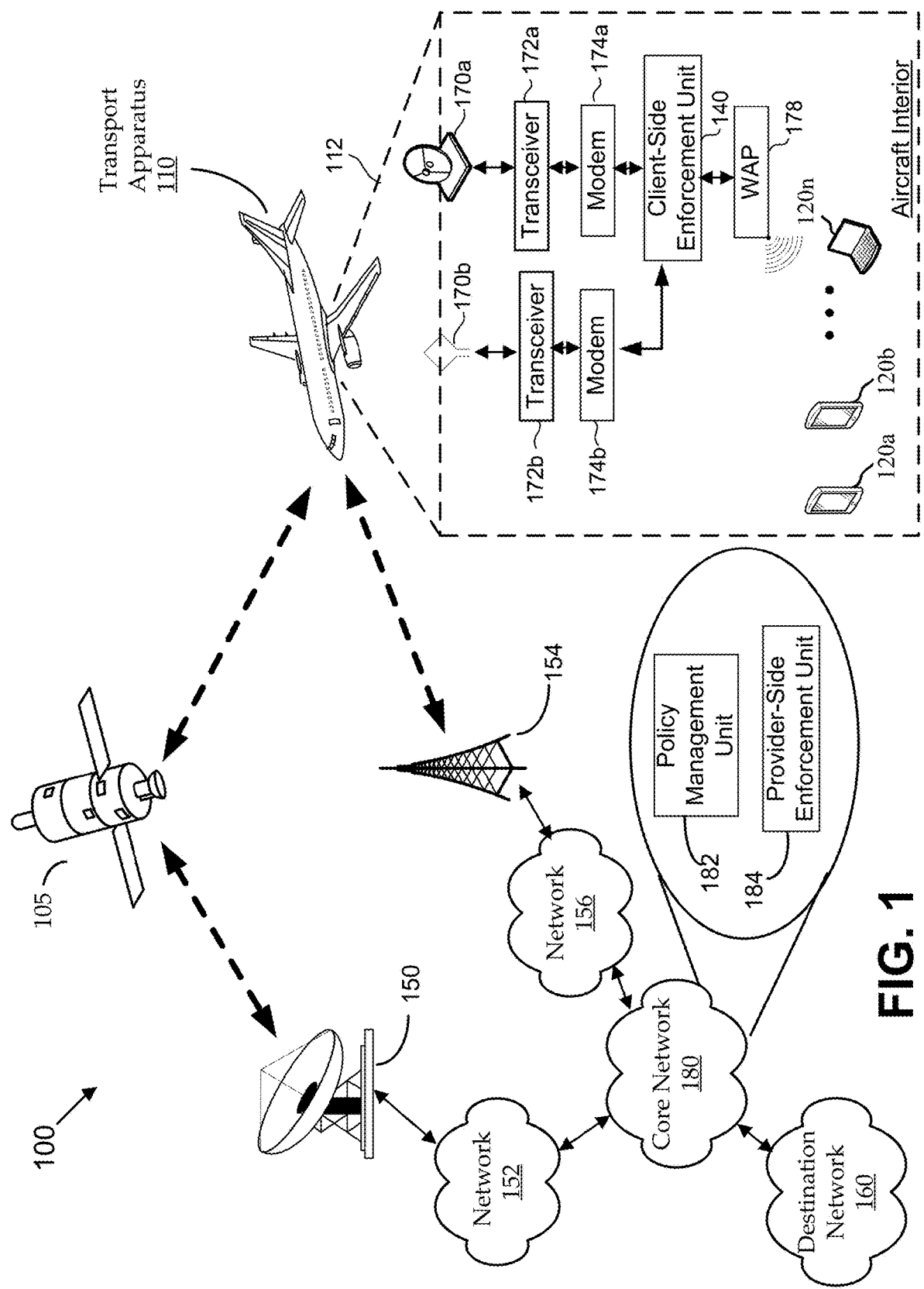
FIG. 1 shows a simplified diagram of a first example of a communications system.

FIG. 1 shows a simplified diagram of a first example of a communications system 100. Many other configurations are possible having more or fewer components than the communications system 100 of FIG. 1. For example, while FIG. 1 is an example of mobile communication terminals discussed below, in some aspects, the methods and systems disclosed herein may be applied to fixed location communication terminals. More generally, the methods and systems described herein may be applied to systems that include fixed location communication terminals and/or include mobile communication terminals.

In the illustrated embodiment, the communications system 100 includes one or more transport apparatus (shown as aircraft 110) in communication with a destination network 160 via a satellite access network (including satellite 105, gateway terminal 150, and network 152), an air-to-ground access network (including air-to-ground tower 154 and network 156), and a core network 180.

While a satellite based access network and an air-to-ground access network are shown as examples in FIG. 1, the disclosed methods and systems contemplate other types of access networks, not limited to those shown in FIG. 1. For example, an access network may include drone, balloon, satellite network (LEO, MEO, or GEO), terrestrial network, or any other type of network that provides communication between two points. Furthermore, while a single core network 180 is shown in FIG. 1, the functionality of the core network 180, and compute and network resources within may be distributed across multiple physical locations.

The transport apparatus 110a can include a two-way communication terminal 112 to facilitate bidirectional communication with the satellite access network and the air-to-ground antenna access network in this example. In the illustrated embodiment, the two-way communication terminal 112 includes two antenna systems 170a-b, two transceivers 172a-b, two modems 174a-b, a client-side enforcement unit 140, a wireless access point (WAP) 178, and one or more in-transport network devices 120a-n. In aspects that provide transportation apparatus with more than two access networks simultaneously, or more than two access networks of different types that require particularly specialized hardware to communicate over said available access networks, then other contemplated embodiments may include three, four, five, six, seven, eight, nine, or ten antennas, transceivers, modems as necessarily to facilitate communication over the available access networks or available access network types.

The core network 180 may also be in communication with the transport apparatus 110a via the satellite access network and the air-to-ground access network. In some aspects, the core network 180 may be in network communication with the transportation apparatus 110a-b via other types of networks, and the satellite access network and air-to-ground network are illustrated as examples. More details of the core network 180 are discussed below with respect to FIG. 3B. The core network 180 may communicate with, for example, client-side enforcement unit(s) 140 installed within the transport apparatus 110a.

The two-way communication terminal 112 installed in the transport apparatus 110a can provide for reception of a forward-link signal from the satellite access network (via network 152, gateway terminal 150, and satellite 105) and/or the air-to-ground access network (via network 156, and air-to-ground tower 154), and transmission of a return-link signal to the satellite access network and/or the air-to-ground access network to support two-way data communications between in-transport network devices 120 within the transport apparatus 110a-b and the destination network 160. The in-transport network devices 120 can include mobile devices (e.g., smartphones, laptops, tablets, netbooks, and the like) such as personal electronic devices (PEDs) brought onto the transport apparatus 110a-b by passengers. As further examples, the in-transport network devices 120 can include passenger seat back systems or other devices on the transport apparatus 110a-b. The network devices 120 can communicate with the client-side enforcement unit 140 via a communication link that can be wired and/or wireless. The communication link can be, for example, part of a local area network such as a wireless local area network (WLAN) support by WAP 178. One or more WAPs 178 can be distributed about the transport apparatus 110*a-b*, and can, in conjunction with a client-side enforcement unit 140, provide traffic switching and routing functionality.

In operation, the client-side enforcement unit 140 can provide uplink data received from the in-transport network devices 120 to either or both of modems 174*a-b* to generate modulated uplink data (e.g., a transmit intermediate frequency (IF) signal) for delivery to the corresponding transceiver 172*a-b* in accordance with an individual return-link policy (discussed in more detail below). The corresponding transceiver 172*a-b* can upconvert and then amplify the modulated uplink data to generate the return-link signal for transmission to the satellite 105 or air-to-ground tower 154 via the corresponding antenna system 170*a-b*. Similarly, the corresponding transceiver 172*a-b* can receive the forward-link signal from the 105 and/or air-to-ground tower 154 via the corresponding antenna system 170*a-b*. The corresponding transceiver(s) 172*a-b* can amplify and downconvert the forward-link signal to generate modulated return-link data (e.g., a receive IF signal) for demodulation by the corresponding modem 174*a-b*. The demodulated return-link data from the modem(s) 174*a-b* can be provided to the client-side enforcement unit 140 for routing to the in-transport network devices 120. One or more of the modems 174*a-b* can be integrated with the client-side enforcement unit 140, or can be a separate component in some examples.

Within the core network 180 may be a policy management unit 182 and a provider-side enforcement unit 184. The policy management unit 182 may manage policies that control the routing of data across multiple access networks, both via the client-side enforcement unit 140 and the provider-side enforcement unit 184. The policies generated by the policy management unit 182 may be individual to a particular client-side enforcement unit or provider-side enforcement unit. For example, a first policy may be generated for a client-side enforcement unit 140 within the transportation apparatus 110 and a second policy may be generated for a second client-side enforcement unit within another transportation apparatus. Furthermore, the policies generated by the policy management unit 182 may include both forward-link policies and separate return-link policies. For example, policy information for the transportation apparatus 110*a* may include a first forward-link policy and a first return-link policy, and policy information for the another transportation apparatus may include a second forward-link policy different from the first forward-link policy and a second return-link policy different from the first return-link policy. In addition, the first and second forward-link policies may be different from the first and second return-link policies respectively. The forward-link policies may be enforced by the provider-side enforcement unit(s) 184 and the return-link polices may be enforced by a client-side enforcement unit 140 installed within the respective transportation apparatus 110*a*.

Furthermore, each of the policies discussed above may be dynamically updated. For example, the policies may be updated as network conditions change and/or as communication terminals, such as the two-way communication terminal 112 on the transportation apparatus 110*a-b* move across a geographic area. Both the policy management unit 182 and provider-side enforcement unit 184 are discussed in more detail below.

In the illustrated embodiment, the transport apparatuses 110*a* is an airplane. Alternatively, the transport apparatus 110*a* may be other than an airplane, such as a train, bus, cruise ship, etc. As illustrated, the destination network 160 can be any type of network and can include for example, the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication as described herein. The destination network 160 can include both wired and wireless connections as well as optical links.

The access networks discussed above may have varied characteristics. For example, while a satellite access network may provide continuous access over a large geographic area, have high capacity and be relatively less expensive to operate, whereas a an air-to-ground access network may provide lower latency network communications. An air-to-ground access network also may not provide the contiguous access over as large a geographic area as a satellite access network.

Furthermore, performance of multiple access networks may vary, not only based on their inherent characteristics of the technologies upon which the access networks rely, but also based on current conditions of each of the access networks. For example, if an airplane is communicating with a satellite via a particular spot beam (e.g., using a particular carrier frequency, polarization, etc.), the capacity of the link can be impacted by how many other users are being serviced by the spot beam (e.g., including other airplanes and/or other transport apparatus 110, mobile user terminals, fixed user terminals, etc.), weather (e.g., rain fade, etc. can cause packet loss and/or other impacts), communications schemes (e.g., modulation and/or coding schemes, etc. can add overhead to the communications), etc.

Figure 2:
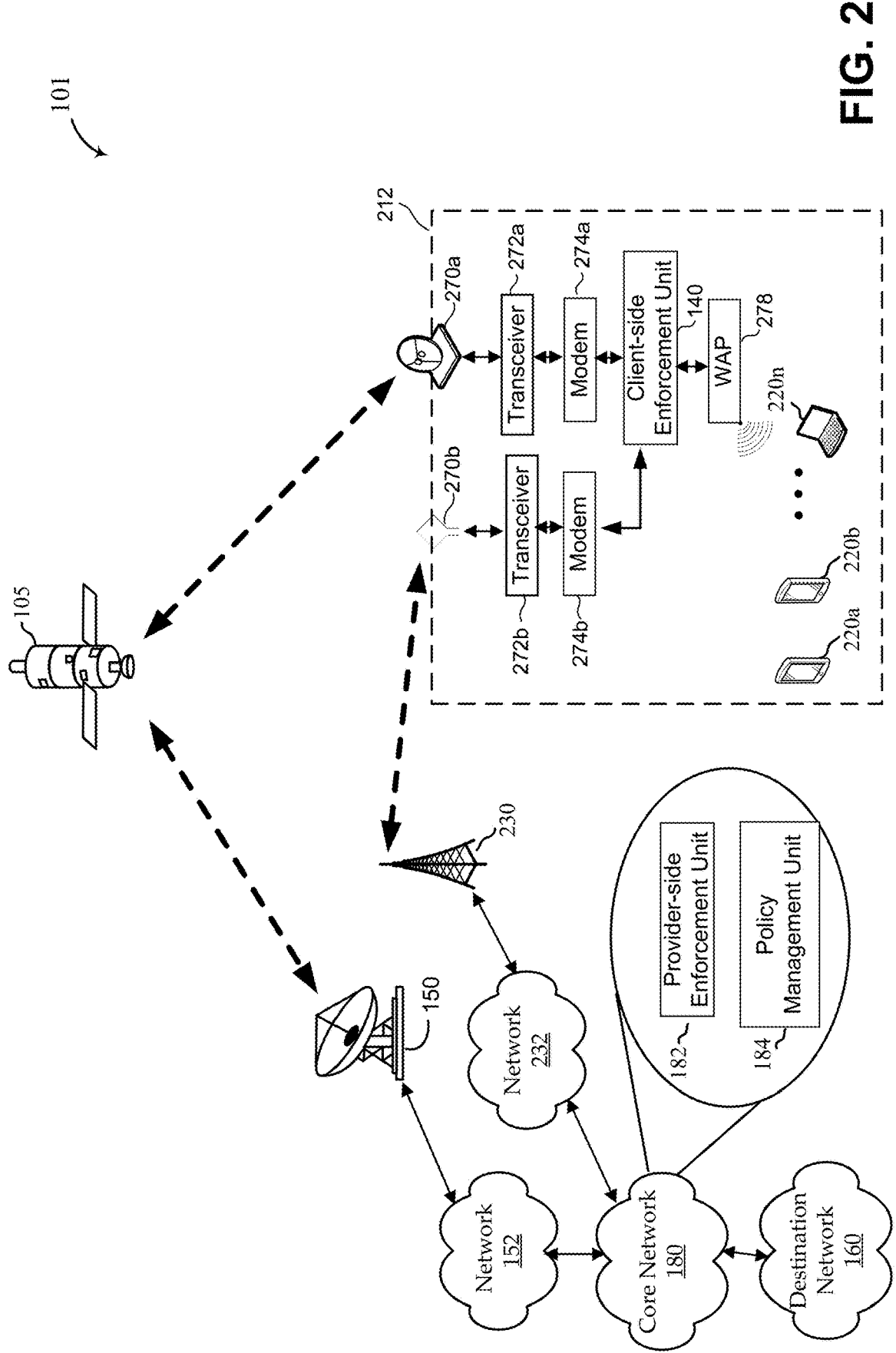
FIG. 2 is a simplified diagram of a second example of a communications system.

FIG. 2 is a simplified diagram of a second communications system 101. Communications system 101 includes one or more network devices 220*a-n* in communication with destination network 160 via satellite access network (including satellite 105, gateway terminal 150, and network 152), a terrestrial access network (including terrestrial tower 230 and network 232), and core network 180. In contrast to the communications system 100 discussed above with respect to FIG. 1, the two-way communication terminal 212 communications system 101 includes a two-way communication terminal 212 that operates from a fixed location (such as a residence or place of business). Similar to FIG. 1, the two-way communication terminal 212 includes a client-side enforcement unit 140 that may determine how to route network messages generated by the respective network devices 220*a*-220*n* over one or more available access networks for delivery to the destination network 160. For example, client-side enforcement unit 140 may determine whether to route each network message generated by network devices 220*a*-220*n* over the satellite access network and/or terrestrial access network. In the illustrated embodiment, the two-way communication terminal 212 communicates wirelessly with terrestrial tower 230. For example, the terrestrial access network may be a cellular network. In other embodiments, the terrestrial access network may communicate with the two-way communication terminal 212 via a wired connection. Similar to the two-way communication terminal 112 of FIG. 1, the two-way communication terminal 212 includes equipment (transceivers 272*a-b*, modems 274*a-b* and WAP 278) to facilitate communication with the satellite access network and the terrestrial access network.

Also similar to the communications system 100 of FIG. 1, the core network 180 is positioned between the destination network 160 and the terrestrial access network and the satellite access network, so as to route network messages destined for one of the network devices 120*a-n* over a plurality of access networks. As was the case in FIG. 1, the core network 180 includes a policy management unit 184 and a provider-side enforcement unit 182. As discussed above with respect to FIG. 1, the policy management unit 184 may be configured to generate individual return-link policies for one or more of the client-side enforcement unit 140*a* and/or network devices 220*a-n*. The policy management unit 184 may also be configured to generate individual forward-link policies for network messages defined or addressed to each of the network devices 120*a-n*. The policy management unit 184 may then distribute these generated forward-link and separate return-link policies to the appropriate provider-side enforcement unit(s) 182 and client-side enforcement unit 140 respectively. As discussed above, forward-link and return-link policies may specify that traffic for a particular network conversation, or network device 120 be routed over first and different second network paths respectively, at least in some aspects. For example, TCP acknowledgements may be communicated over the air-to-ground access network, while the rest of the TCP conversation goes over the satellite access network.

Figure 3:
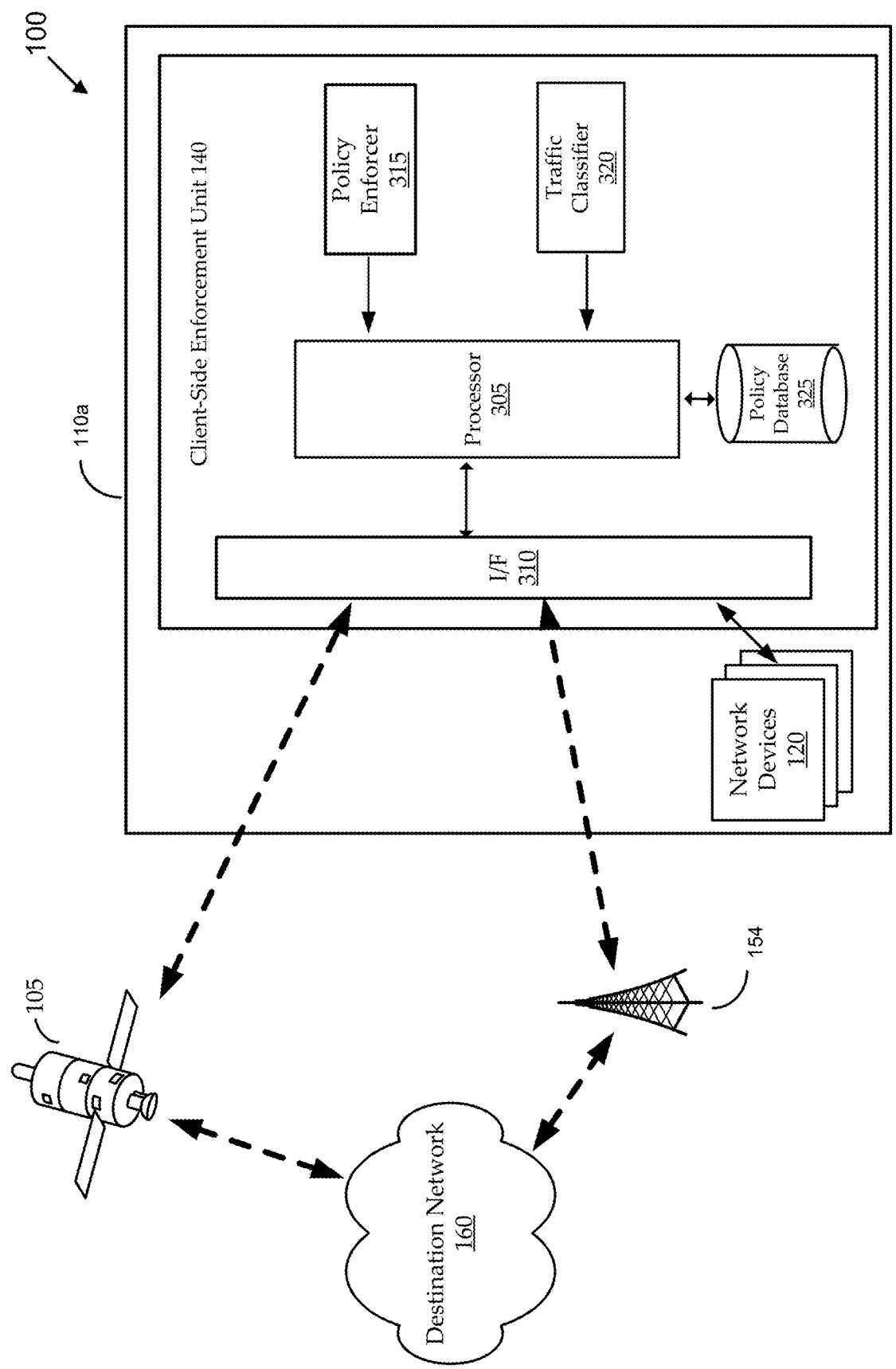
FIG. 3 is a simplified diagram of an example of the communications system of FIG. 1 including a block diagram of an example client-side enforcement unit.

FIG. 3 is a simplified diagram of an example of the communications system 100 of FIG. 1 including a detailed block diagram of the client-side enforcement unit 140. The client-side enforcement unit 140 of the communications system 101 of FIG. 2 may be the same as that shown in FIG. 3. Many other configurations of the client-side enforcement unit 140 are possible having more or fewer components. Moreover, the functionalities described herein can be distributed among the components in a different manner than described herein. The core network 180, gateway terminal 150, and networks 152, 156, and some elements of the two-way communication terminal 112 have been omitted from FIG. 3 to avoid over complication of the drawing.

Consistent with FIGS. 1 and 2, a client-side enforcement unit 140 is in communication, via satellite access network and air-to-ground access network (or other suitable access network, as described above) and other components of the two-way communication terminal 112 (not shown in FIG. 3), with destination network 160. The client-side enforcement unit 140 is also in communication with network devices 120. In FIG. 2 and the following discussion, some components (e.g., antenna system 170, transceiver 172, modem 174, WAP 178) of the two-way communication terminal 112 discussed above with respect to FIG. 1 are omitted to avoid over complication of the drawing.

The illustrated aspect of client-side enforcement unit 140 includes an electronic hardware processor 305, and a network interface 310. The processor 305 may be in communication with the network interface 310 via an electronic bus (not shown) within the client-side enforcement unit 140. The processor may communicate with the network interface 310 to transmit and/or receive packets over a network, such as a network providing connectivity to one or more network devices 120*a-n*. In some aspects, this connectivity may be provided by the wireless access point 178 and/or modem 174 discussed above with respect to FIG. 1.

The client-side enforcement unit 140 also includes a policy enforcer 315, and a traffic classifier 320. The policy enforcer 315, and the traffic classifier 320 may be portions of a volatile or stable storage, such as a virtual or physical memory space accessible to processor 305. The policy enforcer 315, and traffic classifier 320 may include binary data defining instructions that configure the processor 305 to perform various functions. For example, the policy enforcer 315 may include instructions that configure the processor 320 to enforce a policy defining how data generated by one or more of the network devices 120*a-n* is transmitted via the multiple access networks to the destination network 160. For example, the policy enforcer 315 may determine, based on an applicable network policy, whether to route particular data generated by the network devices 120*a-n* to the destination network 160 via the satellite access network or the air-to-ground access network (or other access network as discussed above). In some aspects, the policy enforcer 315 may make these routing decisions based on the policy and also based on characteristics of a particular message being routed. For example, in some aspects, the type of message may determine how the message is routed. In some aspects for example, latency sensitive traffic may be routed over the air-to-ground network while less latency sensitive traffic is routed over the satellite access network. In some aspects, the policy enforcer may make a routing decision based on the size of a network message. For example, in some aspects, messages above a threshold length may be routed over a first access network, while shorter messages with a length lower than the threshold may be routed over a second access network.

The traffic classifier 320 may include instructions that configure the processor 305 to classify messages received from the network devices 120*a-n*. For example, the traffic classifier 320 may classify a message based on one or more of a destination IP address, service access point (SAP), application protocol signature, or the like to determine whether the message is part of an email, web browsing, streaming media, or file transfer network conversation.

In some implementations how traffic is classified may relate to differences between multiple access networks being managed. For example, in some aspects, if a first access network has a higher latency than a second access network, the traffic classifier 320 may determine whether network traffic is latency sensitive or latency insensitive. This information may then be utilized at least in part by the policy enforcer 315 to route the network traffic over either the first access network or the second access network. In some aspects, the first access network may have a different capacity or throughput than the second access network. In these aspects, the traffic classifier 320 may determine an amount of data particular network traffic (such as a network packet or a data stream that is part of a network conversation) is attempting to transmit. The policy enforcer may then route the particular network traffic over either the first access network or the second access network based on the amount of data. For example, network conversations with relatively large amounts of network data to transmit (i.e. amounts of data above a threshold) may be routed over the higher capacity access network, while network conversations with relatively lower amounts of data to transmit (i.e. amounts of data below the threshold) may be routed over the lower capacity access network.

In some aspects, the traffic classified may associate one or more network messages with a particular network conversation. A network conversation may uniquely identify an exchange of data between two end-points. For example, in some aspects, a network conversation may correspond to a single transmission control protocol (TCP) connection (a combination of source/destination IP address, and source/destination service access points). In some aspects, a network conversation may correspond to a unique combination of user datagram service access points and a combination of source/remote IP addresses. For example, data including a source ip address of IP1, a destination ip address of IP2, a source UDP service access point (SAP) of SAP1 and a destination UDP SAP of SAP2 may be the same network conversation as a message indicating a source ip address of IP2, a destination ip address of IP 1, a source UDP SAP of SAP2, and a destination UDP SAP of SAP1.

Instructions in one or more of the policy enforcer 315, and traffic classifier 320 may configure the processor 305 to read data from the policy database3. For example, in some aspects, the processor 305 may read data from the policy database 325 in order to determine a traffic policy to apply to network traffic generated by one or more of the network devices 120. While FIG. 3 shows the client-side enforcement unit 140 as one physical device, the functions discussed above and below relating to the client-side enforcement unit 140 may in some implementations be implemented on multiple physical devices within the transportation apparatus 110. For example, in some aspects, functionality associated with each of the policy enforcer 315, and the traffic manager 320 may each be provided on a separate physical device having its own dedicated electronic hardware processor, memory, and network interface. Additionally, in some implementations, the policy database 325 may also be implemented on one or more devices separate from one or more of the policy enforcer 315, and traffic classifier 320. How the functionality discussed above and below is partitioned across one or multiple physical hardware devices does not substantially effect the methods and systems disclosed herein.

Figure 4A:
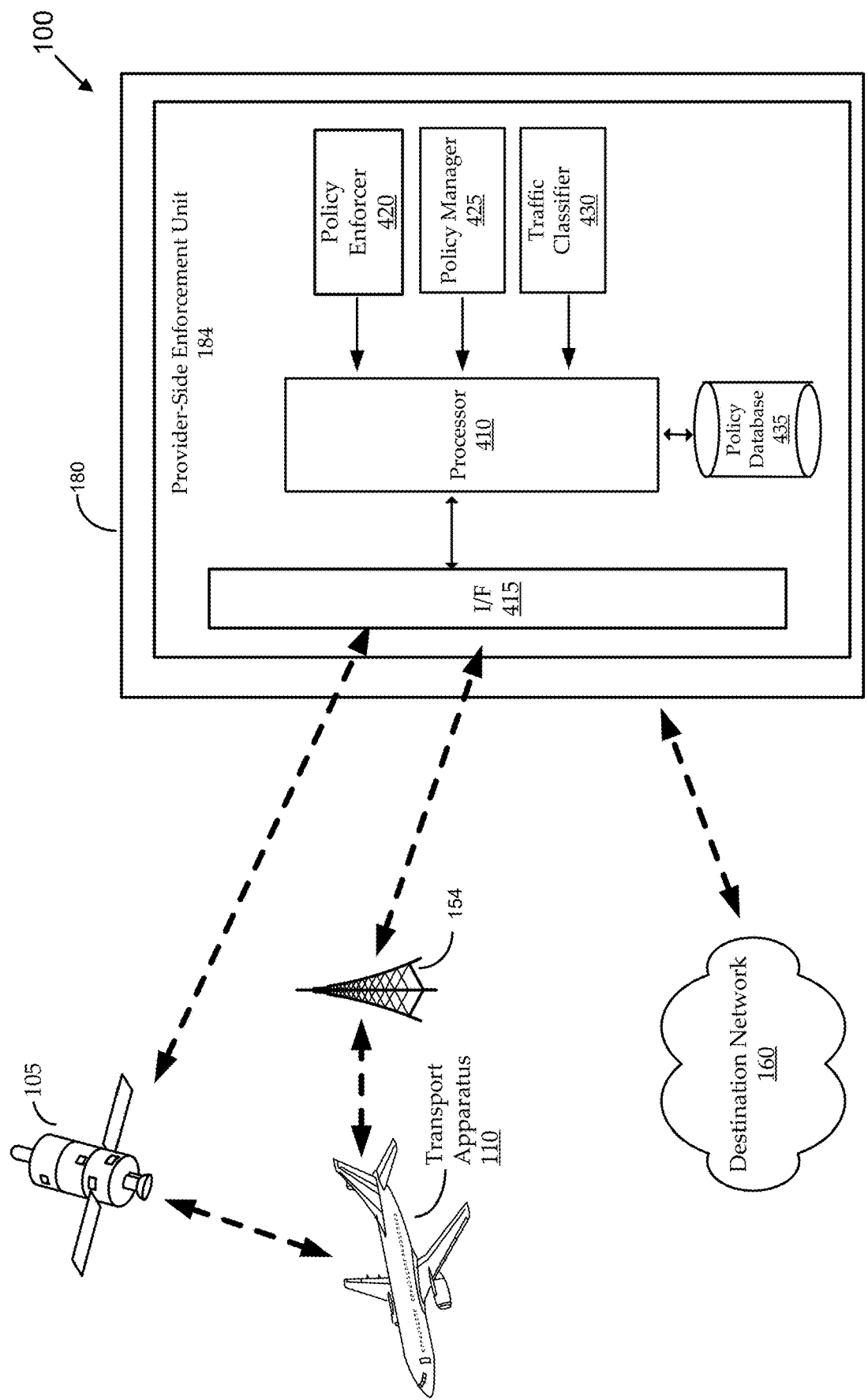
FIG. 4A is a simplified diagram of an example of the communications system of FIG. 1 including a block diagram of an example core network.

FIG. 4A illustrates a simplified diagram of an example of the communications system 100 of FIG. 1 including a block diagram of of the core network 180. The core network 180 of the communications system 100 of FIG. 2 may be the same as that shown in FIG. 4A. Many other configurations of the core network 180 are possible having more or fewer components. Moreover, the functionalities described herein can be distributed among the components in a different manner than described herein.

Within the core network 180 is a provider-side enforcement unit 184 in communication with transportation apparatus 110, and one or more network devices within, as shown in FIG. 1 as network devices 120a-b. The core network 180 communicates with the transport apparatus 110a via satellite access network and/or air-to-ground access network 175, in some aspects. The core network 180 is also in communication with destination network 160. The provider-side enforcement unit 184 receives communication destined for the transportation apparatus 110, and/or network devices 120a-n within the transportation apparatus 110, from the destination network 160. In some aspects, the provider-side enforcement unit 184 may communicate with the satellite access network and/or the air-to-ground access network via network 160, or may communicate with these access networks using other networks and/or technologies.

The illustrated aspect of provider-side enforcement unit 184 includes an electronic hardware processor 410, and a network interface 415. The processor 410 may be in communication with the network interface 415 via an electronic bus (not shown) within the provider-side enforcement unit 405. The processor 410 may communicate with the network interface 415 to transmit and/or receive packets over a network, such as destination network 160.

The provider-side enforcement unit 184 also includes a policy enforcer 420, a policy manager 425, and a traffic classifier 430. The policy enforcer 420, a policy manager 425, and the traffic classifier 430 may be portions of a volatile or stable storage, such as a virtual or physical memory space accessible to processor 410. The policy enforcer 420, policy manager 425, and the traffic classifier 430 may include binary data defining instructions that configure the processor 410 to perform various functions. For example, the policy enforcer 420 may include instructions that configure the processor 410 to enforce a policy defining how forward-link data destined for one or more of the network devices 120a-n resident on the transportation apparatus 110 is transmitted to the transportation apparatus 110. For example, the policy enforcer 420 may determine, based on an applicable network policy, whether to route particular data destined for the network devices 120a-n to the transport apparatus 110 via the satellite access network or the air-to-ground access network. These decisions by the provider-side enforcement unit 184 may enforce a forward-link policy between the destination network 160 and the transportation apparatus 110, in that the policy is enforced for traffic flowing from the destination network 160 to the network devices 120a-n and/or the transportation apparatus 110. In some aspects, the policy enforcer 420 may make these routing decisions based on the policy and also based on characteristics of a particular message being routed. For example, in some aspects, traffic classifier 430 may classify messages received by the provider-side enforcement unit 184 to determine a type of each message. The type may determine how the message is routed. In some aspects for example, latency sensitive traffic types may be routed over one access network while less sensitive traffic is routed over a second access network. In some aspects, whether traffic is latency sensitive or not may be based on one or more of whether the traffic is utilizing a user database protocol (UDP) or not (UDP protocol traffic tends to be more latency sensitive than TCP traffic), whether the traffic is continuous in nature of not (latency sensitive traffic tends to exhibit a continuous nature), and the amount of data transmitted (low amounts of data tend to be used with latency sensitive traffic).

Instructions in one or more of the policy enforcer 420, the policy manager 425, and the traffic classifier 430 may configure the processor 410 to read data from the policy database 435. For example, in some aspects, the processor 410 may read data from the policy database 410 in order to determine a traffic policy to apply to network traffic destined for one or more of the network devices 120 resident within the transport apparatus 110. While FIG. 4A shows the provider-side enforcement unit 184 as one physical device, one of skill in the art would understand that in some aspects, the functions discussed above and below relating to the provider-side enforcement unit 184 may in some implementations be implemented on multiple physical devices. For example, in some aspects, functionality associated with each of the policy enforcer 420, the policy manager 425, and the traffic classifier 430 may each be provided on a separate physical device having its own dedicated electronic hardware processor, memory, and network interface. Additionally, in some implementations, the policy database 435 may also be implemented on one or more devices separate from one or more of the policy enforcer 420, policy manager 425, and traffic classifier 430. How the functionality discussed above and below is partitioned across one or multiple physical hardware devices does not substantially affect the methods and systems disclosed herein.

Figure 4B:
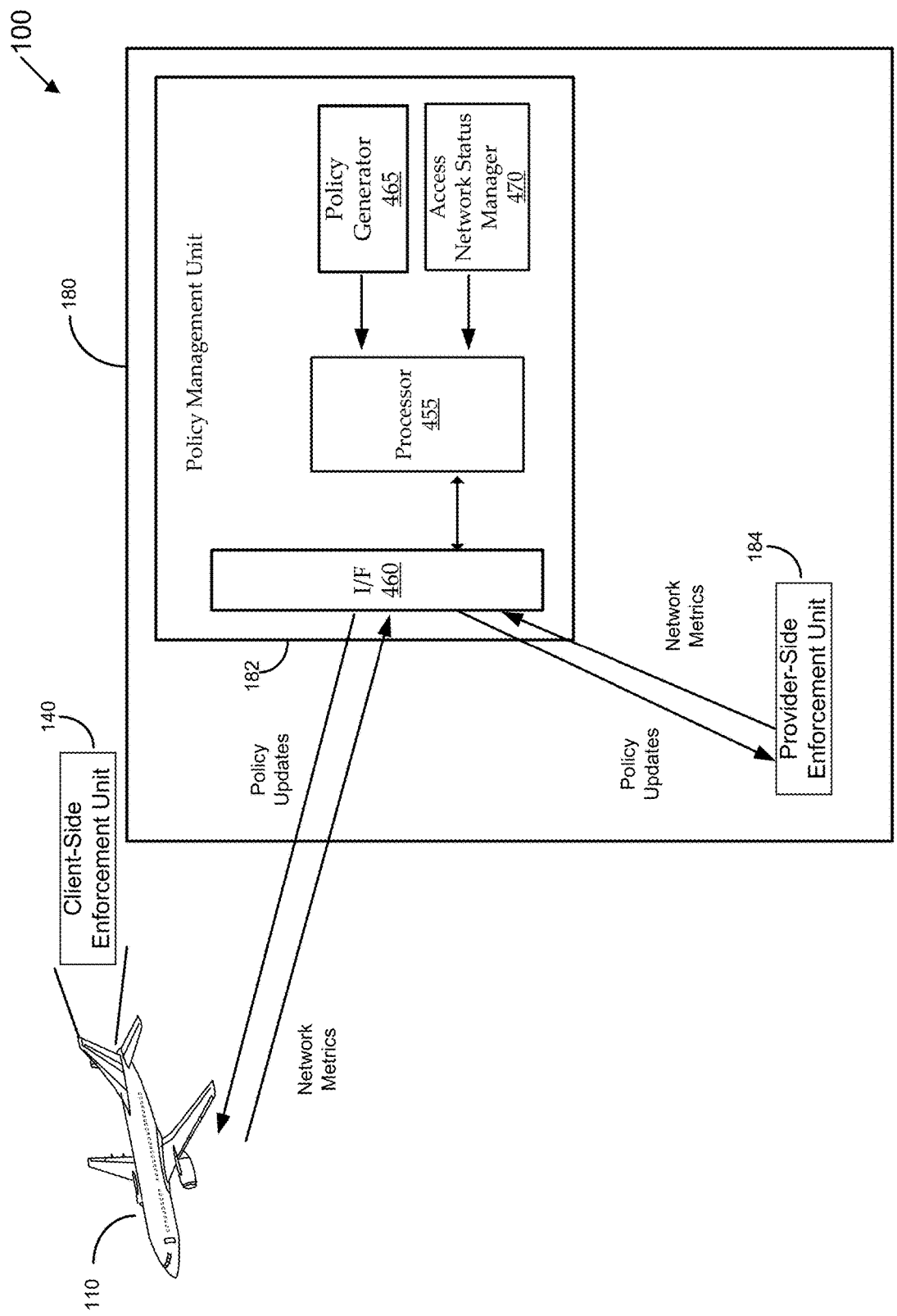
FIG. 4B is a simplified diagram of an example communications system including a block diagram of an example policy management unit of core network.

FIG. 4B is a simplified diagram of an example of the communications system 100 of FIG. 1 including a block diagram of the policy management unit 182 of the core network 180. The policy management unit 182 of the core network 180 of FIG. 2 may be the same as shown in FIG.

4B. Many other configurations of the core network 180 are possible having more or fewer components. Moreover, the functionalities described herein can be distributed among the components in a different manner than described herein.

Policy management unit 182 within the core network 180 is in communication, via satellite access network and air-to-ground access network, or other suitable access network and other components of the two-way communication terminal 112 (not shown in FIG. 4B), with one or more network devices 120*a*-*n*. In particular, FIG. 4B shows that the policy management unit 182 is in communication with a client-side enforcement unit 140 located within a transportation apparatus, such as transportation apparatus 110. The policy management unit 182 is also in communication with a provider-side enforcement unit 184.

The illustrated aspect of the policy management unit 182 includes an electronic hardware processor 455, and a network interface 460. The processor 455 may be in communication with the network interface 460 via an electronic bus (not shown) within the policy management unit 182. The processor 455 may communicate with the network interface 460 to transmit and/or receive packets over a network, such as any network providing connectivity to the client-side enforcement unit 140 and one or more network devices 120*a*-*n*.

The policy management unit 182 also includes a policy generator 465, and an access network status manager 470. The policy generator 465 and the access network status manager 470 may be portions of a volatile or stable storage, such as a virtual or physical memory space accessible to processor 455. The policy generator 465 and the access network status manager 470 may include binary data defining instructions that configure the processor 405 to perform various functions. For example, the policy generator 465 may include instructions that configure the processor 455 to generate a policy defining how return-link data generated by one or more of the network devices 120*a*-*n* is transmitted to the destination network 160, by controlling how the client-side enforcement unit 140 routes data from the devices 120*a*-*n*. For example, the policy generator 465 may configure the processor4 to determine, based on status information of one or more access networks, whether the client-side enforcement unit 140 should route data to the destination network 160 via the satellite access network or the air-to-ground access network.

The policy generator 465 may also configure the processor 455 to generate a specific policy for the provider-side enforcement unit 405. This may be a different policy that a policy provided to the client-side enforcement unit 405. A policy for the provider-side enforcement unit 184 may control how forward-link data is routed from the destination network 160 to the network devices 120*a*-120*n*. In particular, the policy for the provider-side enforcement unit 184 may define how data destined or addressed to the network devices 120*a*-*n* is routed over a first access network or second access network, as described above with respect to FIG. 1.

The access network status manager 470 may contain instructions that configure the processor 455 to receive access network status information from the client-side enforcement unit 140 and/or the provider-side enforcement unit 184. For example, the access network status manager 470 may configure the processor 455 to receive status regarding the satellite access network and/or the air-to-ground access network. The status information may include one or more of congestion information, dropped packet information, latency information, throughput information, or other information characterizing the performance of an access network between the client-side enforcement unit 140 and the destination network 160.

While FIG. 4B shows the policy management unit 182 as one physical device, one of skill in the art would understand that in some aspects, the functions discussed above and below relating to the policy management unit 182 may in some implementations be implemented on multiple physical devices. For example, in some aspects, functionality associated with each of the policy generator 245, and the access network status manager 470 may each be provided on a separate physical device having its own dedicated electronic hardware processor, memory, and network interface. How the functionality discussed above and below is partitioned across one or multiple physical hardware devices does not substantially affect the methods and systems disclosed herein.

Figure 5:
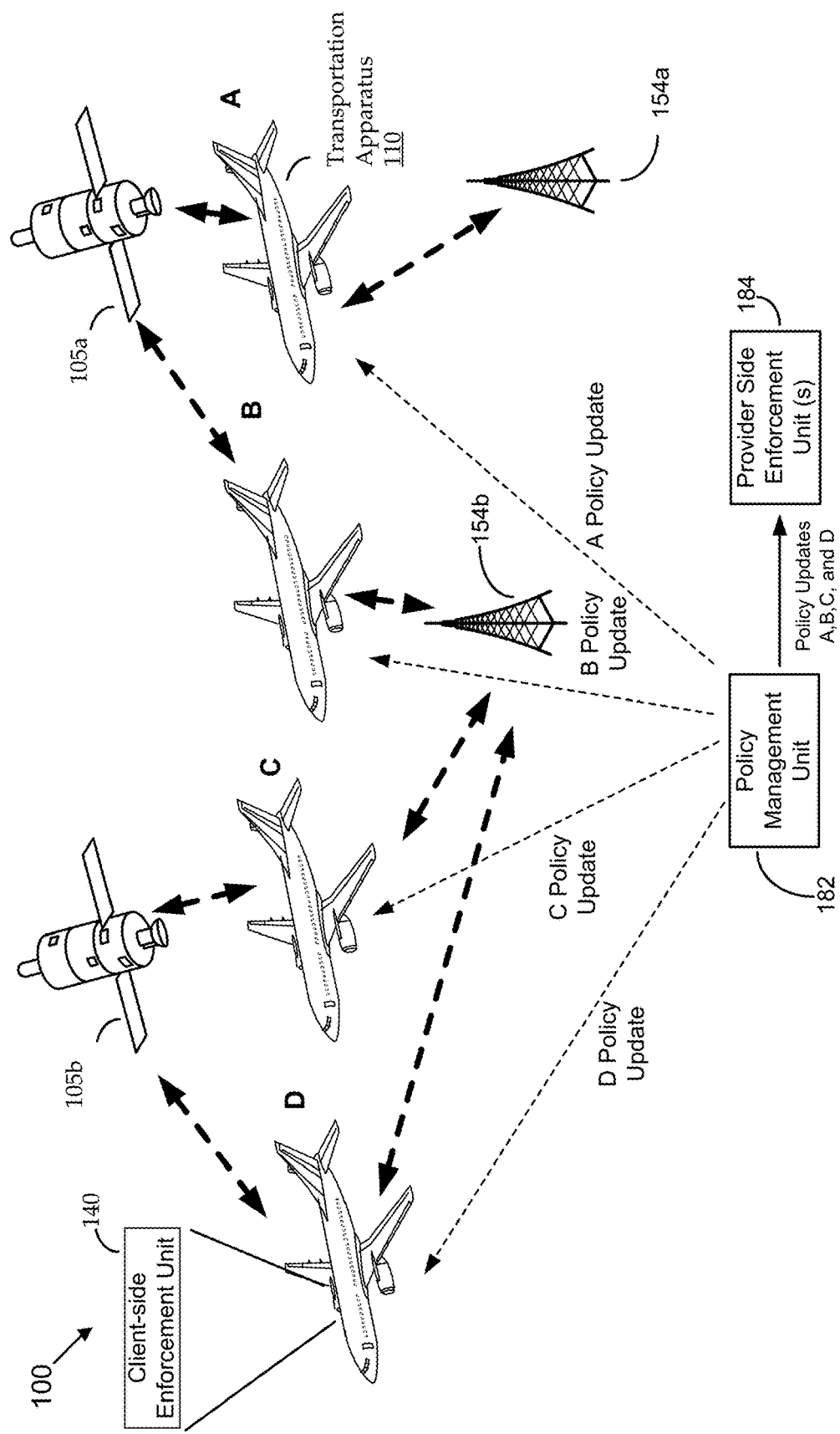
FIG. 5 is a diagram of an in-motion transportation apparatus. The apparatus is shown moving between positions A, B, C, and D.

FIG. 5 is a diagram of an in-motion transportation apparatus 110. The apparatus 110 is shown moving between positions A, B, C, and D. As the transportation apparatus 110 moves between the illustrated positions, different access networks may become available to it, while other access networks may become unavailable to it. When in position A for example, the apparatus 110 communicates via either satellite access network including satellite 105*a* or air-to-ground access network including air-to-ground tower 154*a*. In position B, the apparatus 110 communicates via air-to-ground access network including air-to ground tower 154*b* or satellite access network including satellite 105*a*. In position C, the apparatus 110 communicates via either air-to-ground access network including air-to-ground tower 154*b* or satellite access network including satellite 105*b*. In position D, the apparatus 110 communicates via either air-to-ground access network including air-to-ground tower 154*b* or satellite access network including satellite 105*b*.

FIG. 5 also illustrates that the apparatus 110, and the corresponding client-side enforcement unit 140 contained within the apparatus 110 receives dynamic policy updates at each of the locations A-D. The dynamic policy update received by the transportation apparatus 110 at position A may indicate how the client-side enforcement unit 140 should route data between the multiple access networks available for communication. For example, as discussed below with respect to FIG. 6, the policy management unit 182 may generate the policy based on metrics relating to network performance of the first access network and the second access network. In some aspects, these metrics may be collected by the client-side enforcement unit 140 resident on the transportation apparatus 110, and transmitted to the policy management unit 180. The policy management unit 182 may then generate the policy update based at least in part on the metrics provided to it. The policy management unit 182 may also provide a corresponding policy update to provider-side enforcement unit 184 when the policy update is provided to the transportation apparatus 110 at position A. The policy updates to the client-side and provider-side enforcement units ensure that the forward-link (via the provider-side enforcement unit 184) and the return-link (via the client-side enforcement unit 140) work together to route traffic between the client-side enforcement unit 140 and the destination network 160 (not shown) consistently. For example, in some aspects, network messages included in a single network conversation may be routed over a common access network regardless of whether the traffic is forward-link or return-link traffic. In some other aspects, network messages included in a single network conversation may be routed over different access networks depending on whether the network messages are part of forward-link or reverse-link traffic.

The policy update received by the client-side enforcement unit 140 at position B may indicate how the client-side enforcement unit 140 should route data between the satellite access network provided via satellite 105*a* or air-to-ground access network provided via air-to-ground tower 154*b*. The policy update received by the client-side enforcement unit 140 on board the transportation apparatus 110 at position B may also be based on one or more characteristics of the first and third access network, such as their relative congestion, latency, throughput, among other characteristics. As discussed above with respect to policy updates at position A, the policy management unit 182 may also provide a corresponding policy update to a provider-side enforcement unit 184 when the policy update is provided to the client-side enforcement unit 140 within the transportation apparatus at position B.

The policy update received by the client-side enforcement unit 140 within the transportation apparatus 110 at position C may indicate how the client-side enforcement unit 140 should route data between the fourth access network provided via satellite 105*b* and the third access network provided by via air-to-ground tower 154*b*. The policy update received by the client-side enforcement unit 140 within the transportation apparatus 110 at position C may also be based on one or more characteristics of the third and fourth access network, such as their relative congestion, latency, throughput, among other characteristics. As discussed above with respect to policy updates at positions A and B, the policy management unit 182 may also provide a corresponding policy update to a provider-side enforcement unit 184 when the policy update is provided to the client-side enforcement unit 140 within the transportation apparatus at position C.

The policy update received by the client-side enforcement unit 140 within the transportation apparatus 110 at position D may indicate how the client-side enforcement unit 140 should route data between the fourth access network provided via satellite 105*b* and the third access network provided via air-to-ground tower 154*b*. The policy update received by the client-side enforcement unit 140 within the transportation apparatus 110 at position D may also be based on one or more characteristics of the third and fourth access network, such as their relative congestion, latency, throughput, among other characteristics.

Although, in the illustrated example, the client-side enforcement unit 140 within the transportation apparatus 110*a* has the same access networks available to it at both positions C and D, the policy update provided at position D may be based on metrics characterizing network performance of the third and fourth access networks that are different than metrics collected at position C that also characterize network performance of the third and fourth access networks. For example, in some aspects, the performance of the third and/or fourth access networks may change as the client-side enforcement unit 140 within the transportation apparatus 110 moves from position C to position D. This change may be reflected in relative differences between the metrics collected at or in proximity to each position. Thus, the policy management unit 180 may be configured to generate a policy for the client-side enforcement unit 140 that is different at position D than at position C, based at least on changed conditions of the third and/or fourth access networks at position D relative to position C. As discussed above with respect to policy updates when the client-side enforcement unit 140 within the transportation apparatus 110 is at positions A-C, the policy management unit 182 may also provide a corresponding policy update to a provider-side enforcement unit 184 when the policy update is provided to the client-side enforcement unit 140 within the transportation apparatus at position D. The corresponding policy update may ensure an individual forward-link and individual return-link policy for a particular client-side enforcement unit 140 within the transportation apparatus are consistent, such that messages included in a particular network conversation using a particular client-side enforcement unit 140 within the transportation apparatus are routed over the same access network. In some aspects however, the policy update may define different individual forward-link and individual reverse-link policies such that forward-link network messages are routed over a different network path than reverse link network messages.

Figure 6:
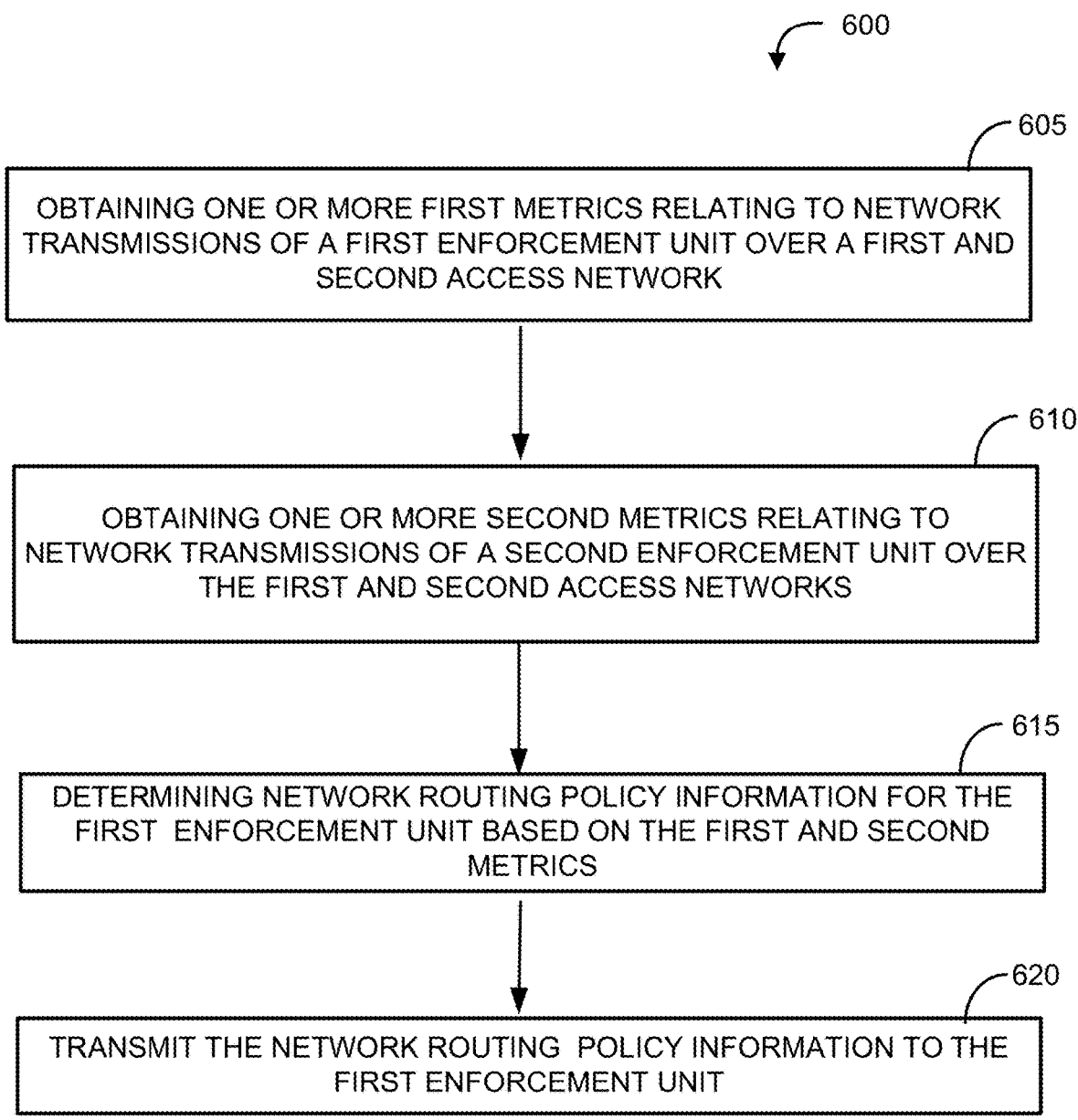
FIG. 6 is a flowchart of a method of dynamically updating transmission routing policy for an enforcement unit.

FIG. 6 is a flowchart of a method of dynamically updating an individual routing policy for an enforcement unit. The routing policy may control, in some aspects, how one or more network messages are routed over one or more access networks. In some aspects, process 600 may be performed within the communications system 100, 101 illustrated in FIGS. 1 and 2. For example, in some aspects, the electronic hardware processor 455 of the policy management unit 182 may be configured by instructions stored in a memory, for example, as represented by policy generator 465 and access network status manager 470, to perform one or more of the functions described below with respect to process 600.

In block 605, one or more first metrics relating to network transmissions of a first enforcement unit over a first and second access network are obtained. In some aspects, the first metrics may be received by the policy management unit 182 shown in FIG. 4B from the first enforcement unit. In some aspects, a first portion of the first metrics may relate to network transmissions and/or receptions by the first enforcement unit over the first access network, while a second portion of the first metrics may relate to network transmissions and/or receptions by the first enforcement unit over the second access network. The metrics may include measurements of activity over the first or second access network such as one or more of a measurement of a level of congestion, latency measurements, cost measurements, capacity measurements, dropped packet measurements, or throughput measurements. In some aspects, one or more of the functions discussed above with respect to block 605 may be performed by the processor 455, configured by instructions stored in the access network status manager 470, discussed above with respect to FIG. 4B.

In block 610, one or more second metrics relating to network transmissions of a second enforcement unit over the first and second access network are received. The second metrics may also be received by the policy management unit 182 in some aspects. A first portion of the second metrics may relate to network transmissions by the second enforcement unit over the first access network, while a second portion of the second metrics may relate to network transmissions by the second enforcement unit over the second access network. The second metrics may include measurements of activity over the first or second access network such as one or more of a measurement of a level of congestion, latency measurements, cost measurements, capacity measurements, dropped packet measurements, or throughput measurements. In some aspects, one or more of the functions discussed above with respect to block 610 may be performed by the processor 455 configured by instructions stored in the access network status manager 470, discussed above with respect to FIG. 4B.

In some aspects, the first and second enforcement units discussed above may be a client-side enforcement unit 140 and a provider-side enforcement unit 184.

In block 615, individual network routing policy information is determined for the first enforcement unit based on the first and second metrics. The network routing policy determined in block 615 is a policy that is individual for the first enforcement unit. In some aspects, an individual policy is a policy that has been customized based on one or more attributes of the first enforcement unit. For example, in some aspects, portions of the first and second metrics relating to the first access network may be aggregated or summarized to produce one or more metrics characterizing performance of the first access network based on data from at least the first and second enforcement units. Similarly, in some aspects, portions of the first and second metrics relating to the second access network may be aggregated or summarized to produce one or more metrics characterizing performance of the second access network.

Metrics characterizing the first access network and metrics characterizing the second access network may then be evaluated to determine the network routing policy. For example, in some aspects, if the determined metrics indicate that the first access network provides reduced latency relative to the second access network, the network routing policy may be defined to transmit a greater percentage of network data over the first access network as compared to the second access network. In contrast, in this example embodiment, if the determined metrics indicate the first access network provides increased latency relative to the second access network, block 615 may generate or determine a network routing policy that transmits a larger percentage of network data over the second access network as compared to the first access network.

In some aspects, the network routing policy may be generated to transmit latency sensitive network messages over an access network providing lower latency and/or more predictable latency (such as that measured by a latency variance or latency standard deviation). The enforcement unit may be configured to characterize one or more network messages generated by a communication terminal as either latency sensitive or non-latency sensitive based on one or more of an application type, source or destination IP address, source or destination service access point, or other characteristics of the network messages. In some aspects, one or more of the functions discussed above with respect to block 615 may be performed by the policy generator 465, discussed above with respect to FIG. 4B.

In some aspects of block 615, the network routing policy may be generated to define a network routing policy for a network message based on a user or subscriber associated with the network message. For example, in some aspects, the policy management unit may generate the transmission policy based on network usage of the first access network and the second access network by the subscriber over a previous period of time.

In some aspects of block 615, the network routing policy may be generated based on an aggregated usage of a plurality of enforcement units over a previous period of time. The plurality of enforcement units is not necessarily all of the enforcement units within the system 100 of FIG. 1, but may include a group of enforcement units. For example, the plurality may consist of enforcement units resident in a particular group of transportation apparatuses but not other transportation apparatuses within the system 100.

For example, in some aspects, a network routing policy may be based on aggregated usage from a plurality of enforcement units within a particular geographic region. For example, a first client-side enforcement unit may pass into a first geographic region, generate a first set of network performance measurements, and then move out of the first geographic region, and generate a second set of network performance measurements. A second client-side enforcement unit may pass into the first geography region, generate a third set of network performance measurements, and then move out of the first geographic region. The second client-side enforcement unit may then generate a fourth set of network performance measurements. Some aspects may aggregate the first and third set of performance measurements to determine an aggregated characterization of the first region, but not include the second and fourth sets of performance measurements in the characterization.

In some aspects of block 615, network routing policies for multiple enforcement units are determined. For example, in some aspects, a network routing policy for a group of enforcement units may be determined. In some aspects, each enforcement unit is included in the group based on a type of communication terminal associated with the enforcement unit. For example, in some aspects, enforcement units associated with fixed location communication terminals may be include in one group, while enforcement units associated with mobile communication terminals, such as an aircraft, bus, train, or the like, may be associated with a second group. In these aspects, enforcement units in the same group may utilize the same network policy, while enforcement units in a different group utilize a different network policy. In some aspects, a portion of a transmission policy for each enforcement unit in a group generated to be common, while a second portion of each transmission policy for enforcement units in a group may vary between members of the group.

In some aspects of block 615, the network routing policy is generated to define how an enforcement unit should route a received network message based on the time of data the received network message is received. For example, the network routing policy may define that the first access network be utilized for transmissions during a first time period and the second access network is utilized for transmissions during a second time period.

In some aspects, the network routing policy is generated to define that an enforcement unit routes a received network message based on a type of device generating the received network message. For example, in some aspects, the network routing policy may indicate that a enforcement unit should utilize the first access network for laptops and the second access network for cell phones and tablets.

In some aspects of block 615, a network routing policy for one or more of a client-side enforcement unit and a provider-side enforcement unit may be determined based on the first and second metrics. The provider-side enforcement unit network routing policy may enforce a forward-link policy for network traffic destined for the client-side enforcement unit (and/or a network device residing on the same transportation apparatus as the client-side enforcement unit). The client-side enforcement unit network routing policy may enforce an individual return-link policy for network traffic destined (indirectly) for a provider-side enforcement unit. For example, the traffic may be destined for one or more devices residing within the destination network 160, but may be required to flow through a provider-side enforcement unit to reach their destination. The provider-side enforcement unit network routing policy and/or the separate client-side enforcement unit network routing policy may provide for consistent routing of network conversations between the client-side and provider-side enforcement units. For example, if a particular conversation is routed over a first access network by the client-side enforcement unit, the conversation is routed over the first access network by the provider-side enforcement unit as well. In some aspects, the generated network policy for the provider-side enforcement unit may route data for a particular network conversation over a different access network than the corresponding client-side enforcement unit.

In block 620, the determined network routing policy information is transmitted to the first enforcement unit. In some aspects, the first enforcement unit may then apply the network transmission routing policy to determine whether traffic it receives should be routed over the first access network or the second access network. In some aspects, one or more of the functions discussed above with respect to block 620 may be performed by the processor 455 configured by instructions stored in the policy generator 465, discussed above with respect to FIG. 4B.

In some aspects, process 600 includes determining one or more access networks that may be available to the first enforcement unit during a particular time period. For example, as shown in FIG. 5, the transportation apparatus 110 may be in motion across a geographic area. As a transportation apparatus moves, some access networks previously accessible may become inaccessible to those apparatuses; while other access networks previous inaccessible may become accessible. Thus, in some aspects, a device performing process 600, such as a policy management unit 450, may be configured to dynamically determine which access networks are accessible to a client-side enforcement unit 140 when determining a network routing policy for the client-side enforcement unit. This information may be considered along with the first and/or second metrics as described above, to determine how a particular enforcement unit in a particular geographic region should route data to available access networks.

Furthermore, in some aspects, changes to a set of available access networks to a client-side enforcement unit may cause process 600 to be performed. For example, as a transportation apparatus moves, one or more access networks may become unavailable to the respective client-side enforcement unit and/or one or more additional access networks may become available to the client-side enforcement unit. Process 600 may be performed in response to one or more of these changes. Similarly, process 600 may be performed in response to a change in one or more aspects of performance of one or more of the access networks. For example, if one or more of the available access networks goes offline, or alternatively experiences a reduced or increased amount of network congestion, process 600 may be performed to adjust one or more of an individual forward-link policy and/or individual return-link policy of the client-side enforcement unit such that the routing of individual forward-link data or individual return-link data is appropriate for the given network conditions of available access networks.

To determine which access networks are available, in some aspects, a policy management unit 182 may receive information indicating the accessibility of access networks to a particular enforcement unit from that particular enforcement unit. For example, in some aspects, an enforcement unit may send status information to the policy management unit 182, for example, over a network, indicating which access networks are currently available to it. In some aspects, the policy management unit 182 may read a data store (such as a database) that provides an indication of accessible networks based on a geographic location of the communication terminal containing the enforcement unit. Thus, in some aspects, the policy management unit 182 may generate a network routing policy based at least in part, on the geographic location of the corresponding communication terminal and/or a data store mapping a geographic location to accessible access networks. Thus, the system shown in FIG. 1, via performance of process 600, may function to dynamically update transmission policies of one or more client-side enforcement units as corresponding communication terminals containing the enforcement units move across a geographic region. The policy updates may be a function not only of the physical location of the transportation apparatus and therefore the enforcement unit contained therein, but also based on conditions of one or more networks accessible to the enforcement unit at the physical location. Those conditions may be based on actual operational experience of the particular enforcement unit and the one or more networks.

Figure 7:
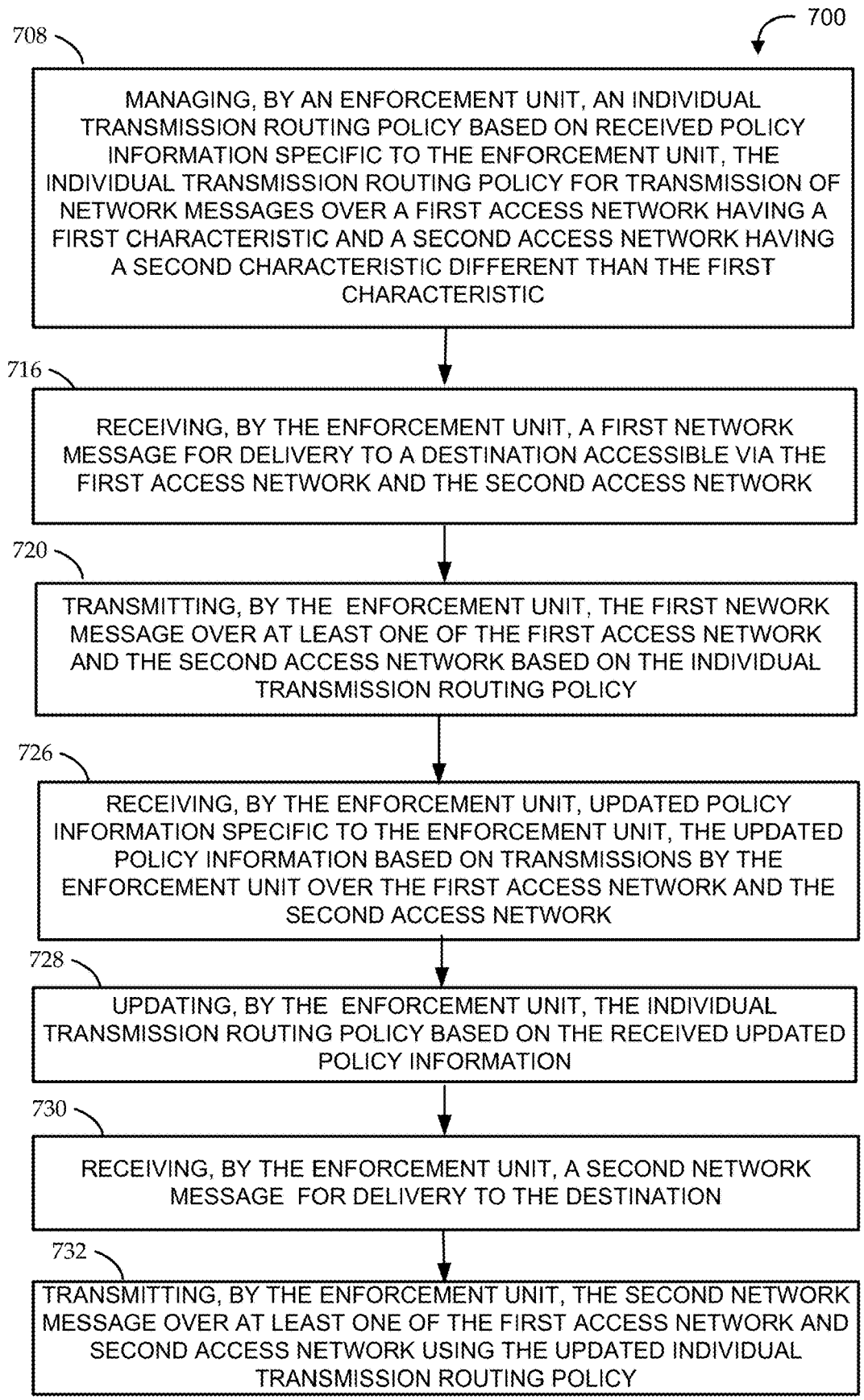
FIG. 7 is a flowchart of a method of dynamically updating transmission routing policy for an enforcement unit.

FIG. 7 is a flowchart of a method of dynamically updating an individual routing policy for an enforcement unit. In some aspects, process 700 may be performed within the communications systems illustrated in FIGS. 1-4. In some aspects, the electronic hardware processor 305 of the client-side enforcement unit 140 may perform one or more of the functions discussed below with respect to process 700. For example, the electronic hardware processor 305 may be configured by instructions in one or more of the policy enforcer 315 and/or traffic classifier 320 to perform the functions described below with respect to process 700.

In some other aspects, the process 700 may be performed by the electronic hardware processor 410 of the provider-side enforcement unit 184. For example, the electronic hardware processor 410 may be configured by instructions in one or more of the policy enforcer 420, policy manager 425, and/or traffic classifier 430 to perform the functions described below with respect to process 700.

Since process 700 may be implemented in various aspects by either a client-side enforcement unit or a provider-side enforcement unit, process 700 may be utilized to implement individual forward-link policies or individual return-link policies and are generally referred to as a "transmission routing policy" in the process 700 of FIG. 7.

In block 708, an individual transmission routing policy is managed based on received policy information. The received policy information is specific to the enforcement unit. For example, the received policy information may include an identifier associating the policy information with the enforcement unit. Some aspects of process 700 include determining whether an identifier included in the policy information identifies the enforcement unit. If no identifier is found, the policy information may not be further processed by the enforcement unit. For example, blocks below block 708 in FIG. 7 may not be performed in this case.

In some aspects, the received policy information includes an individual return-link policy to be dynamically enforced by a client-side enforcement unit. In some aspects, the received policy information defines an individual forward-link policy to be dynamically enforced by a provider-side enforcement unit. In some aspects, process 700 may dynamically enforce one or more of an individual return-link policy by a client-side enforcement unit and an individual return-link policy by a provider-side enforcement unit. In some aspects, the return-link policy and the forward-link policy may provide inconsistent routing for network messages communicated with two network devices sharing the same communication terminal. For example, in some aspects, a first network message sent by a first network device may utilize a network path including a first access network (and not a second access network) while a second network message sent by a second network device may utilize a network path including the second access network (and not the first access network). In other aspects, both the first and second network messages may utilize the same network path.

In some aspects, if the enforcement unit is a client-side enforcement unit, the received policy defines an individual return-link policy in that it controls how data generated by one or more network devices is routed over one or more access networks.

In some aspects, if the enforcement unit is a provider-side enforcement unit, the received policy defines a forward-link policy in that it controls how data received from the destination network 160 and destined for or addressed to a transportation apparatus (such as transportation apparatus 110), or a network device within the transportation apparatus, such as one or more of network devices 120*a*-*n*, is routed over one or more access devices to reach the destination device.

In some aspects, the received policy information is transmitted by another device, such as a device within the core network 180, only to the enforcement unit. In some aspects, a second device, such as the policy management unit 182, may generate the policy information specifically for the particular enforcement unit. For example, the policy information may be generated based on a current or anticipated location of the enforcement unit, and then transmitted to the enforcement unit, directly or indirectly, by the second device. In some aspects, the received individual policy information may have been generated specifically based on access networks available to the enforcement unit at a particular time or at a particular location of the enforcement unit.

The individual transmission routing policy may define whether messages received by the enforcement unit, such as messages transmitted by or transmitted to network devices 120*a*-*n*, are transmitted by the enforcement unit over a first access network or a second access network. In some aspects, the first access network and/or the second access network may have different characteristics. For example, in some aspects, the first and second access networks may have different congestion levels, latencies, throughputs, or other different network performance.

In block 716, the enforcement unit receives a first network message from a network device. The network device from which the first network message is received may be any device that can provide a message for transmission over a network. The network device may be any type of device such as end-user devices, appliances, etc. If the enforcement unit is a client-side enforcement unit, the device from which the first network message is received may be a network device used by a passenger on a transportation apparatus, such as one of the network devices 120*a*-*n* illustrated in FIG. 1, or a network device 220*a*-*n* illustrated in FIG. 2. This may include any of a cell phone, tablet, laptop computer, or other computing device. If the enforcement unit is a provider-side enforcement unit, the network message may be transmitted by any device with network connectivity to destination network 160. For example, the first network message may be transmitted by a web server or streaming media server, transmitting data to a passenger on a transportation apparatus, such as apparatus 110.

The received message is for delivery to a destination that is accessible to the enforcement unit via the first access network and the second access network. For example, if the enforcement unit is a client-side enforcement unit, the received message may include a destination address for a device that resides within or is accessible via destination network 160 of FIGS. 1-2. Multiple routing paths may be available from the client-side enforcement unit to the destination network. In some aspects, the client-side enforcement unit may maintain or have access to routing information, for example, an Internet Protocol routing table, that indicates a destination address of the received message is accessible via a first routing path and a second routing path. For example, in embodiments utilizing Internet Protocol (IP) routing, a destination IP address included in an IP header of the received message may be accessible via multiple routes, such as routes utilizing the satellite access network or air-to-ground access network FIG.

If the enforcement unit is a provider-side enforcement unit, the message is addressed to a destination device accessible via the first access network and the second access network. For example, a device on the network 160 may transmit the first network message to a network device which is accessible to the provider-side enforcement unit 182 via multiple access networks. As discussed above, this accessibility may be based, in some aspects, on Internet protocol addresses of the destination device and IP routing tables maintained by or accessible to the provider-side enforcement unit.

In block 720, the enforcement unit transmits the first network message via at least one of the first access network and the second access network. In some aspects, the enforcement unit determines whether the first network message is transmitted via the first or second access network based on the received policy information. The received policy information may, in some embodiments, indicate whether the first or second access network is preferred for a destination address of the first network message.

In some aspects, the enforcement unit may classify the first network message, and the routing decision may be based on the classification. The classification may be performed based on one or more portions of the network message. For example, as shown in FIG. 3, a traffic classifier 320 may analyze portions of the first network message to determine whether the first network message is email data, streaming media, web browsing data, file transfer data, or other type of data. Depending on the classification, the transmission policy may indicate whether the first network message should be routed over the first access network or the second access network.

In some other aspects, the received policy information may define routing rules that when executed, determine whether the first network message is transmitted over the first or second access network. For example, in some aspects, the received policy information may define a routing rule that indicates streaming media data is transmitted over the first access network while email data is transmitted over the second access network. In some aspects, the rules may be evaluated in a defined order, such that some rules defined by the received policy information take precedence over other rules defined by the received policy information.

In some aspects, the received policy information may define that a network message generated by a first type of device (such as a laptop) is transmitted over the first access network and a network message generated by a second type of device (such as a cell phone or tablet) is transmitted over the second access network.

In block 726, the enforcement unit receives updated policy information that is also specific to the enforcement unit. The updated policy information may be based on transmissions by the enforcement unit over the first access network and/or the second access network.

In block 728, the enforcement unit updates the individual transmission routing policy based on the received updated policy information. In some aspects, updating the individual transmission routing policy may include overwriting or integrating the transmission policy of block 708 with the received updated policy information received in block 726.

In block 730, a second network message is received by the enforcement unit. The second network message is for delivery to the destination. For example, in the case of a client-side enforcement unit, the second network message may include a destination address (such as an IP address) that is accessible via destination network 160, and can be routed over either access network. In the case of a provider-side enforcement unit, the network message may be destined for a network device provider-side enforcement unit 184 via either access network.

In block 732, the enforcement unit transmits the second network message over the first or second access network based on the updated individual transmission routing policy. As discussed above with respect to block 720, the updated individual transmission routing policy may define whether the second network message is transmitted over at least one of the first access network and the second access network. For example, the updated individual transmission routing policy may indicate all messages should be transmitted over one of the first or second access networks. Alternatively, the updated individual transmission policy may indicate transmission of the second network message over the first or second access network is conditional on one or more characteristics of the second network message, such as source and/or destination addresses, service access points, application protocol type (such as streaming media, email data, web browsing data, and the like). In some aspects, the updated transmission routing policy received in block 728 may indicate that the second network message be sent over the same access network used to transmit the first network message in block 720.

Figure 8:
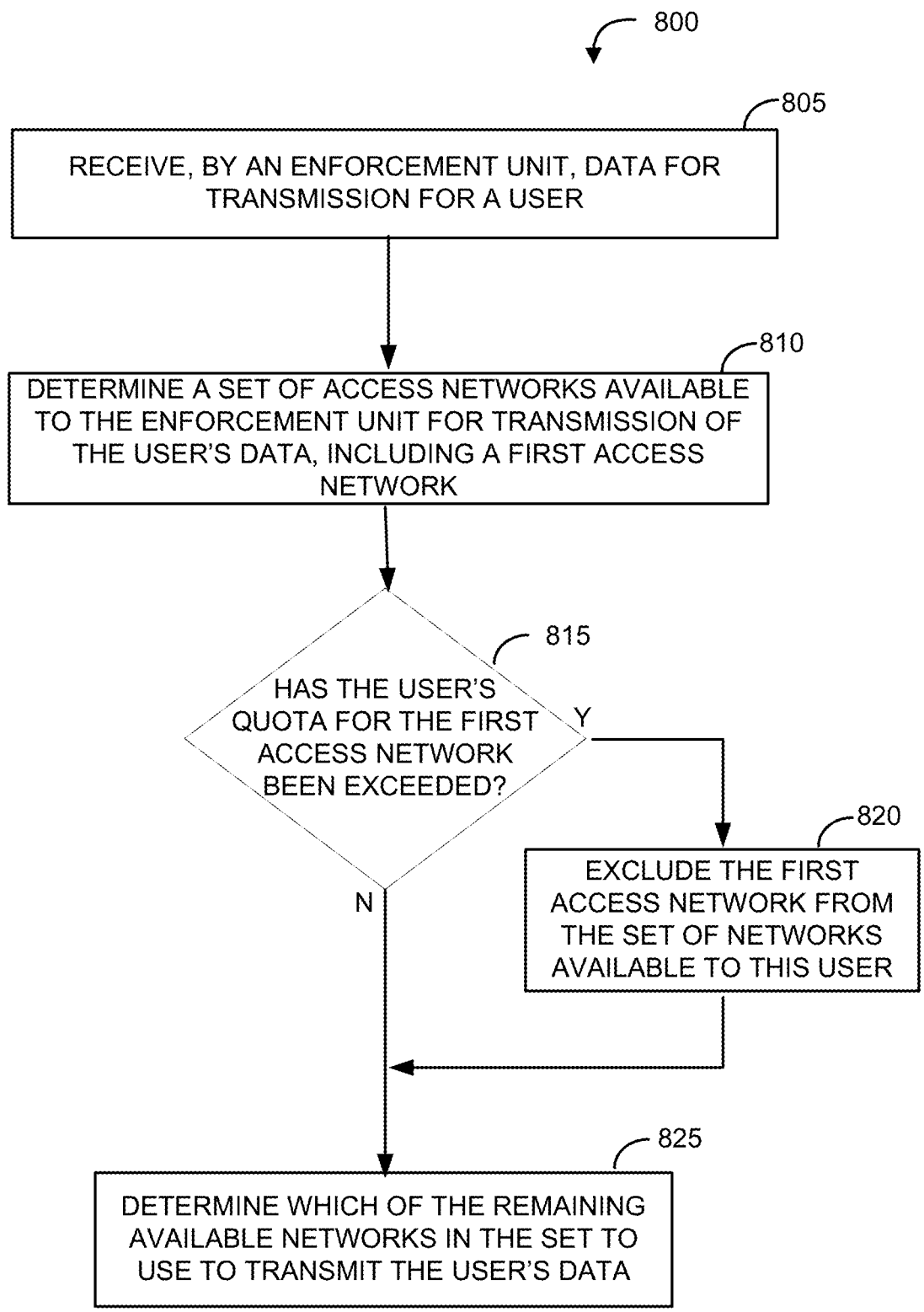
FIG. 8 is a flowchart of a method for routing user data at an enforcement unit.

FIG. 8 is a flowchart of a method for routing user data at an enforcement unit. In some aspects, the method 800 discussed below with respect to FIG. 8 may be performed by one or more of the client-side enforcement unit 140 and the provider-side enforcement unit 182. For example, instructions in the policy enforcer 315 and/or the policy enforcer 420 may configure the processors 305 and 410 respectively to perform one or more of the functions discussed below with respect to FIG. 8. Furthermore, the policy generator 465 may configure the processor 455 to generate policy information that configures one or more of the client-side enforcement unit and/or provider-side enforcement unit to perform process 800. For example, in some aspects, the policy generator 465 may generate rules implementing process 800, and transmit the rules to the appropriate enforcement units. Alternatively, the policy generator 465 may transmit data defining the quota limits for one or more users to the appropriate enforcement units so that they can properly perform process 800.

Since process 800 may be implemented by either a provider-side enforcement unit or a client-side enforcement unit, the quota described below with respect to FIG. 8 can be specific to an individual return-link policy or an individual forward link-policy, or both in some aspects. In other words, separate quota values may be implemented for both return-link and forward-link data in some aspects. Alternatively, forward and return-link data may share a quota in other aspects.

In block 805, data is received by an enforcement unit for transmission for the user. For example, in some aspects, the data received in block 805 may be generated by a network device 120*a-n* or 220*a-n* as shown in FIGS. 1-2 (for example, if the referenced enforcement unit is a client-side enforcement unit). Alternatively, the data received in block 805 may be generated by a device on the destination network 160, that is destined for one of the network devices 120*a-n* or 220*a-n* (for example, if the referenced enforcement unit is a provider-side enforcement unit).

In block 810, a set of access networks available to the enforcement unit for transmission of the user's data is determined. This set of access networks includes a first access network and a second access network. The set of access networks determined in block 810 represents access networks that provide a network path to a destination node indicated by the data (for example, via a destination IP address) from the enforcement unit.

Block 815 determines whether the user's quota for the first access network has been exceeded. In some aspects, user quotas may be maintained for one or more of the access networks in the set of access networks determined in block 810. In some aspects, an aggregated sum of data transmitted over an access networks on behalf of the user within a time period, such as one day, one week, one month or any time period may be maintained. When the sum exceeds the quota for the time period, use of that network for that user may be limited or prevented in some aspects. In some aspects, the time period may correspond to a contract period for the user/subscriber. In some aspects, the time period may be unrelated to the user's contract period.

In some aspects, the quota may not be user-specific. For example, in these aspects, decision block 815 may evaluate whether a maximum bandwidth within a time period would be exceeded if the user data was transmitted over the first access network. For example, in some aspects, process 800 may aggregate all data sent over the first access network during a time period. When this aggregated amount of data for all users exceeds a quota, the user's network device(s) referenced in FIG. 8 may be prevented from sending additional data over the first access network.

In some aspects, the quota may not be an amount of data transmitted over the access network, but instead may be a maximum number of concurrent users that may utilize the first access network. In these aspects, block 815 may compare a current number of users of the first access network to a quota for the first access network. If the current number of users equals or exceeds the quota, then process 800 may move to block 820 from block 815.

As shown in block 820, if the quota is exceeded, the first access network is excluded from the set of access networks. In block 825, the remaining access networks in the set are used to determine how to send the user's data. For example, in some aspects, process 800 may be utilized by block 825 to determine how to send data over one of multiple access networks (note the first access network of FIG. 7 may be a different access network than the first access network of FIG. 8).

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method of dynamically updating routing policy, the method comprising:

managing, by a client-side enforcement unit, an individual return-link policy based on received policy information specific to the client-side enforcement unit, the individual return-link policy for transmission of network messages over a first access network having a first characteristic and a second access network having a second characteristic different than the first characteristic;

receiving, by the client-side enforcement unit, a first network message from a network device for delivery to a destination network accessible via the first access network and the second access network;

transmitting, by the client-side enforcement unit, the first network message over at least one of the first access network and the second access network using the individual return-link policy;

receiving, by the client-side enforcement unit, updated policy information specific to the client-side enforcement unit, the updated policy information based on transmissions by the client-side enforcement unit over the first access network and the second access network;

updating, by the client-side enforcement unit, the individual return-link policy based on the received updated policy information;

receiving, by the client-side enforcement unit, a second network message from the network device for delivery to the destination network; and transmitting, by the client-side enforcement unit, the second network message over the first access network or the second access network using the updated individual return-link policy.

2. The method of claim 1, wherein:
the method is for operation on a system comprising a plurality of client-side enforcement units and a policy management unit,
the client-side enforcement unit is a first one of the client-side enforcement units, and
the method further comprises:
managing, by individual ones of the client-side enforcement units, individual return-link policies based on policy information received from the policy management unit that is specific to the corresponding client-side enforcement unit.

3. The method of claim 2 further comprising:
obtaining, by the policy management unit, use information regarding transmissions to or from the first client-side enforcement unit over the first access network and the second access network;
updating, by the policy management unit, the policy information specific to the first client-side enforcement unit based on the use information; and
transmitting, by the policy management unit to the first client-side enforcement unit, the updated policy information specific to the first client-side enforcement unit.

4. The method of claim 2, wherein the plurality of client-side enforcement units includes a first group of client-side enforcement units and a second group of client-side enforcement units, wherein individual return-link policies of each client-side enforcement unit of the first group are different than individual return-link policies of each client-side enforcement unit of the second group.

5. The method of claim 4, wherein each client-side enforcement unit of the first group is associated with a first type of communications terminal, and each client-side enforcement unit of the second group is associated with a second type of communications terminal.

6. The method of claim 4, wherein at least a portion of individual return-link policies of each client-side enforcement unit of the first group are in common.

7. The method of claim 2, wherein:
the method is for operation on a system further comprising a provider-side enforcement unit, and
the method further comprises:
managing, by the provider-side enforcement unit, an individual forward-link policy based on second policy information specific to the first client-side enforcement unit;
receiving, by the provider-side enforcement unit, a network message for delivery to the network device; and
transmitting, by the provider-side enforcement unit, the network message for delivery to the network device over at least one of the first access network and the second access network using the individual forward-link policy.

8. The method of claim 2, wherein transmitting the first network message comprises:
transmitting a first portion of the first network message over the first access network, and
transmitting a second portion of the network message over the second access network.

9. The method of claim 2, wherein the first characteristic of the first access network and the second characteristic of the second access network include at least one of latency, cost, capacity and congestion.

10. The method of claim 2, wherein the first access network is a satellite network, and the second access network is a terrestrial network.

11. The method of claim 2 further comprising:
classifying, by a traffic classifier of the first client-side enforcement unit, the first network message,
wherein transmitting the first network message comprises transmitting the first network message over at least one of the first access network and the second access network further based on the classification of the network message.

12. The method of claim 2, wherein the transmissions by the first client-side enforcement unit over the first access network and the second access network are during a previous period of time.

13. The method of claim 12, wherein the transmissions are by a subscriber associated with the first client-side enforcement unit.

14. The method of claim 2, wherein updating the individual return-link policy is further based on aggregate network usage of the first access network and the second access network by the plurality of client-side enforcement units over a previous period of time.

15. The method of claim 2, wherein updating the individual return-link policy is further based on a geographic location of the first client-side enforcement unit.

16. The method of claim 2, wherein updating the individual return-link policy is further based on a time of day of reception of the updated policy information by the first client-side enforcement unit.

17. The method of claim 2 further comprising:
determining a device type of the network device,
wherein transmitting the second network message is further based on the device type.

* * * * *